United States Patent Office 3,021,260
Patented Feb. 13, 1962

3,021,260
MONO-GLYCOL ESTERS OF 3,5-DI-IODO-4-PYRIDONE - N - ACETIC ACID X-RAY CONTRAST AGENTS IN BRONCHOGRAPHY
Alfred Distelmaier and Werner Scholtan, Wuppertal-Elberfeld, Germany, assignors, by mesne assignments, to Farbenfabriken Bayer Aktiengesellschaft, Leverkusen-Bayerwerk, Germany, a corporation of Germany
No Drawing. Filed Aug. 26, 1958, Ser. No. 757,131
Claims priority, application Germany Sept. 11, 1957
7 Claims. (Cl. 167—95)

This invention relates, generally, to novel organic chemical compounds useful as radiopaque media for X-ray diagnostics and, more particularly, it relates to certain hydroxy esters of 3,5-diiodo-4-pyridone-N-acetic acid which have been found to be admirably suited for use as X-ray contrast media for bronchography.

Heretofore, various contrast media requiring different methods of administration have been proposed for use in bronchography, and numerous papers have been published in the medical and allied journals concerning the techniques of this form of diagnostic treatment including, for example, premedication, anesthesia, application of radiopaque agents, and contrast media. It appears quite clearly from these experiences that present contrast media for bronchographical applications are not entirely satisfactory.

Thus, since the lungs contribute to the distribution of the contrast medium through their inspiratory suction, there exists the ever present danger that the medium might penetrate too far into the lung periphery. In evaluating the usefulness of any contrast medium intended for use in bronchography, it is therefore essential to know how residual quantities of the medium which are not removed via the air passages are handled by this organ. For example, certain known iodized oils have the distinct advantage of being non-irritating, but residues of these oils are poorly eliminated from the lungs, with the result that the lung tissue can be damaged through use of such media. Certain known forms of water-soluble contrast media are combined with a high-viscosity carrier substance, such that the high-viscosity of the resulting preparation will mitigate seepage of the media into the periphery of the lungs. Being hypertonic solutions, however, these forms of contrast media severely irritate the bronchial mucosa, necessitating extensive use of anesthetics. Moreover, residues of the viscosity carrier have been detected in the non-respiratory portions of the lung, where they may initiate untoward tissue reactions.

In addition to the foregoing types of media, certain iodine-containing esters in the form of aqueous contrast medium suspensions have also been employed heretofore for bronchography. While such suspensions usually do not irritate the bronchial mucosa, they do produce the undesirable side effects of elevated temperatures, which often last for 3 to 4 days, as well as settling of the medium in the lung periphery.

The present invention is based, in part, on our discovery that certain esters of iodized contrast media that contain one or more hydroxyl groups in the ester substituent, form ideal contrast media for bronchography.

In general, the compounds of the invention are produced by reacting, according to conventional procedures, iodized contrast media containing free carboxyl groups with a large excess of dihydric or polyhydric alcohols, in such manner that only one hydroxyl group of the polyhydroxyl reagent reacts with the carboxyl group in ester formation.

As the carboxyl-bearing reagents used in the production of the novel contrast media of our invention, we prefer to employ substances which have shown good contrast properties in X-ray diagnostics, in general, such as 3,5-diiodo-4-pyridone-N-acetic acid. Virtually any polyhydric alcohol can be employed as the hydroxyl-bearing reagent including, by way of illustration, α-glycols, β-glycols, glycerol, etc.

The novel contrast media of our invention may be represented in general by the following structural formula:

(I)    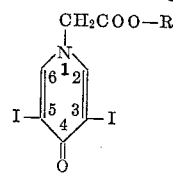

wherein R is an alkyl group carrying at least one hydroxyl substituent.

We prefer to employ the new esters for bronchography in the form of aqueous suspensions. These suspensions are prepared by the addition of a suitable agent for increasing the viscosity of the preparation, and a suitable agent for increasing the viscosity of the preparation, and a suitable dispersing agent. Typical viscosity-increasing carriers include carboxylated cellulose, cellulose ether, polyvinyl alcohol, etc. As dispersing agents, we prefer to employ a non-ionic emulsifier, such as reaction products of fatty acids, fatty alcohols, or neutral fats with ethylene oxide, or emulsifiers of the so-called "Tween" series (polyoxyalkylene derivatives of hexitol anhydride partial long chain fatty acid esters). Preferably, the new media should have particle sizes falling predominantly within the range of 5–30 microns.

In the clinical testing of the contrast media of the invention in bronchography, the following results have been obtained:

(1) No irritation of the bronchial mucosa was produced, so that the bronchographical observations were not disturbed by coughing;

(2) The media showed surprisingly strong adhesion in the bronchial system, which prevented migration of the agent into the lung periphery;

(3) The new compounds were found to be rapidly and completely absorbed by the organism, with no contrast medium being visible in the lungs on control X-rays taken 36 hours later;

(4) No temperature rise was observed in the patients after the bronchography.

It is believed that the invention may be best understood by reference to the following specific examples which illustrate the preparation of typical contrast media as defined above:

EXAMPLE I

Monoglycol ester of 3,5-diiodo-4-pyridone-N-acetic acid, as represented by the formula:

(II)    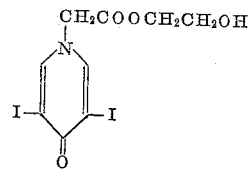

Ethylene glycol, in amount 200 grams, 150 cubic centimeters of benzene, and 4 cubic centimeters of concentrated sulfuric acid were mixed in an agitated flask with a superimposed water separator carried thereon. After addition of 100 grams of 3,5-diiodo-4-pyridone-N-acetic acid, the reaction mixture was heated at the boil for 5 hours. Initially, the substance dissolved, and in the course of the reaction the desired ester precipitated in part. Cooling overnight completed the precipitation. Following suction-filtration the residue was washed first with acetone and then with highly dilute soda solution and water. The resultant monoglycol ester of 3,5-diiodo-4-pyridone-N-acetic acid recrystallizes readily from acetone. It crystallizes in the form of white crystals melting at 186–189° C. (Yield: 100 grams.)

EXAMPLE II

*Mono-1,2-propylene glycol ester of 3,5-diiodo-4-pyridone-N-acetic acid, as represented by the formula:*

(III)

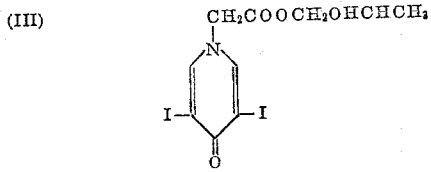

1,2-propylene glycol, in amount 105 grams, 115 cubic centimeters of benzene, and 4 cubic centimeters of concentrated sulfuric acid were mixed in the same apparatus as described in Example I. Following the addition of 100 grams of 3,5-diiodo-4-pyridone-N-acetic acid, the reaction mixture was heated at the boil for 5 hours, and the water formed during the reaction was collected in the water separator. Thereafter, the benzene was distilled off under vacuum, and the residue was poured into 400 cubic centimeters of water. This caused the desired mono-1,2-propylene glycol 3,5-diiodo-4-pyridone-N-acetate to precipitate. The white crystals were filtered off by suction and washed successively with a highly dilute soda solution and with water. The compound can be recrystallized from ethanol or acetone. It melts at 169–172° C. (Yield: 90 grams.)

EXAMPLE III

*Mono-(2,2-dimethyl-1,3-propanediol) ester of 3,5-diiodo-4-pyridone-N-acetic acid, as represented by the formula:*

(IV)

CH$_2$COOCH$_2$CCH$_2$OH
       |
       CH$_3$
       |
       CH$_3$

In the same manner as described in the preceding examples, 40 grams of 3,5-diiodo-4-pyridone-N-acetic acid, 84 grams of 2,2-dimethyl-1,3-propanediol, 90 cubic centimeters of benzene, and 5 cubic centimeters of concentrated sulfuric acid were heated at the boil for 5 hours. The reaction mixture was treated as described in Example II to crystallize the desired mono-(2,2-dimethyl-1,3-propanediol) ester of 3,5-diiodo-4-pyridone-N-acetic acid. The compound can be recrystallized from alcohol, forming white crystals of melting point 205–208° C. (Yield: 33 grams.)

EXAMPLE IV

*3,5-diiodo-4-pyridone-N-acetylglycerol, as represented by the formula:*

(V)

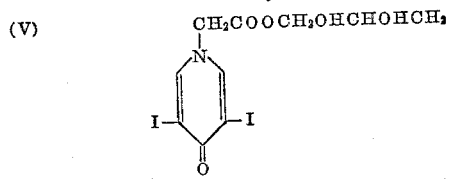

Twenty (20) grams of 3,5-diiodo-4-pyridone-N-acetic acid were heated to the boil as described in Example II, with 46 grams of glycerol, 50 cubic centimeters of benzene, and 2.5 cubic centimeters of concentrated sulfuric acid for 3½ hours. The precipitated 3,5-diiodo-4-pyridone-N-acetylglycerol can be purified by recrystallization from water. The compound forms colorless crystals of melting point 120–124° C.

Having thus described the subject matter of our invention, what it is desired to secure by Letters Patent is:

1. A chemical compound represented by the formula:

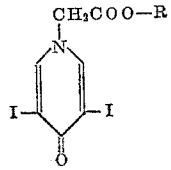

wherein R is a member selected from the group consisting of monoglycol and mono-1,2-propylene glycol.

2. The monoglycol ester of 3,5-diiodo-4-pyridone-N-acetic acid.

3. The mono-1,2-propylene glycol ester of 3,5-diiodo-4-pyridone-N-acetic acid.

4. A composition of matter for use as a contrast medium in bronchography that comprises, an aqueous suspension of a compound represented by the formula:

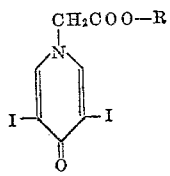

wherein R is a member selected from the group consisting of monoglycol and mono-1,2-propylene glycol; and an emulsifying agent.

5. A composition of matter for use as a contrast medium in bronchography that comprises an aqueous suspension of the mono-1,2-propylene glycol ester of 3,5-diiodo-4-pyridone-N-acetic acid and an emulsifying agent.

6. Process for rendering the bronchi of a subject radiopaque that comprises introducing into said bronchi a compound of the formula:

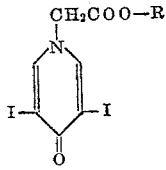

wherein R is a member selected from the group consisting of monoglycol and mono-1,2-propylene glycol.

7. Process for rendering the bronchi of a subject radiopaque that comprises introducing into said bronchi the mono-1,2-propylene glycol ester of 3,5-diiodo-4-pyridone-N-acetic acid.

References Cited in the file of this patent

UNITED STATES PATENTS

| | | |
|---|---|---|
| 2,064,944 | Reitmann | Dec. 22, 1936 |
| 2,272,484 | Shelton | Feb. 10, 1942 |
| 2,505,634 | Archer | Apr. 2, 1950 |
| 2,870,063 | LaMater | Jan. 20, 1959 |

FOREIGN PATENTS

| | | |
|---|---|---|
| 517,382 | Great Britain | Jan. 29, 1940 |